April 18, 1961 A. J. LUSCOMBE 2,980,407
BEARING PROTECTIVE STRUCTURE FOR THE AUGER OF A FEED MIXER
Filed May 29, 1959
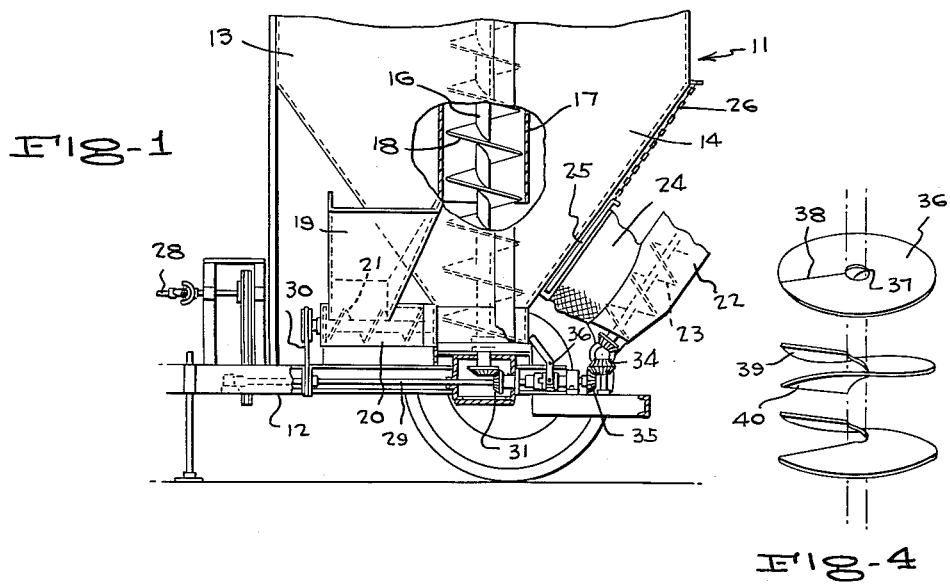
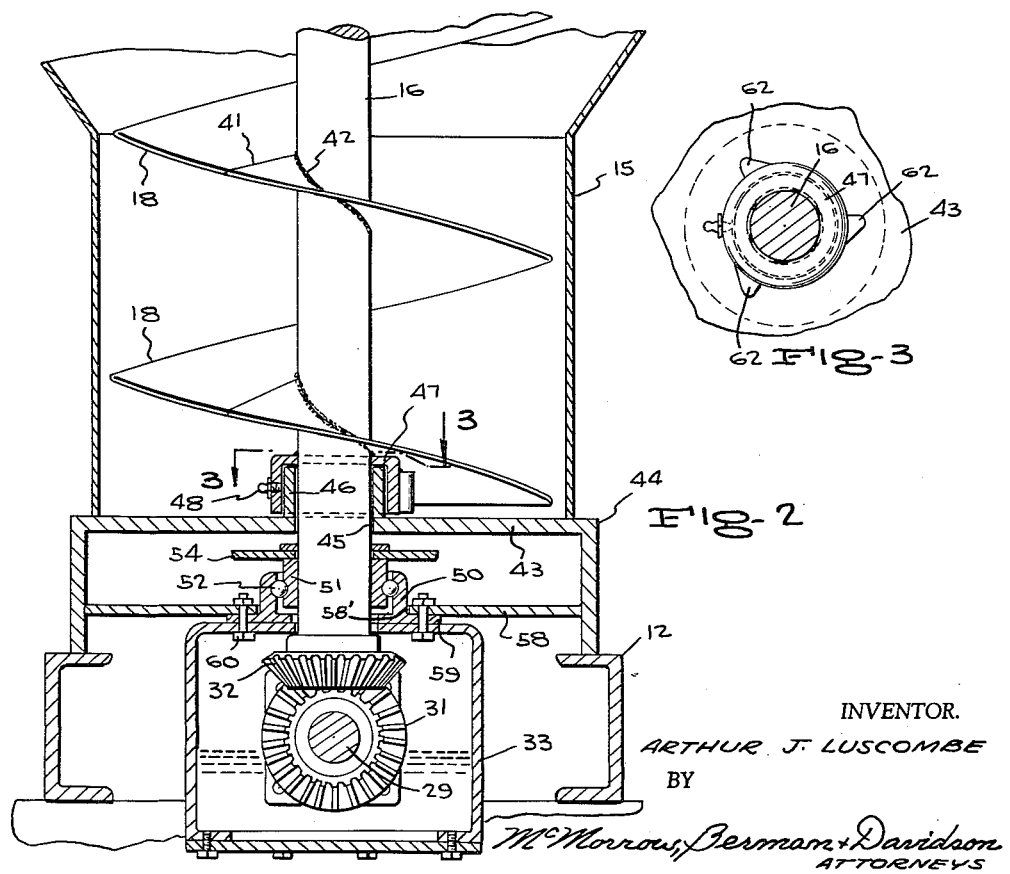
INVENTOR.
ARTHUR J. LUSCOMBE
BY
McMorrow, Berman + Davidson
ATTORNEYS United States Patent Office 2,980,407
Patented Apr. 18, 1961

2,980,407

BEARING PROTECTIVE STRUCTURE FOR THE AUGER OF A FEED MIXER

Arthur J. Luscombe, R.F.D., Dolliver, Iowa

Filed May 29, 1959, Ser. No. 816,836

1 Claim. (Cl. 259—97)

This invention relates to a mixing apparatus for feed, grains, fodder, forage, cereals, and the like, and more particularly to bearing protective structure for the mixing auger of a feed mixer.

A main object of the invention is to provide a novel and improved bearing assembly for the vertical mixing auger of a feed mixer, said assembly involving relatively simple parts, being easy to install, and serving to greatly prolong the useful life of the parts of the bearings supporting the vertical auger of a feed mixer.

A further object of the invention is to provide an improved bearing assembly for the vertical auger of a feed mixer, the assembly involving relatively inexpensive components, being durable in construction, being arranged so that a minimum amount of maintenance is required, and greatly reducing wear on bearings and other moving elements of the supporting assembly of a vertical auger forming part of a feed mixer.

Further objects and advantages of the invention will become apparent from the following description and claim, and from the accompanying drawings wherein:

Figure 1 is a fragmentary side elevational view, partly in vertical cross section, of a portable feed mixer provided with bearing protective means for the vertical auger thereof, in accordance with the present invention.

Figure 2 is an enlarged vertical cross sectional view taken through the bottom collar portion of the conical lower end of the feed hopper of Figure 1, showing the detailed structure of the bearings employed with the mixing auger shaft, as well as the driving gears associated with said shaft.

Figure 3 is a horizontal cross sectional view taken on the line 3—3 of Figure 2.

Figure 4 is a perspective view showing the manner in which disc elements are formed to define the successive flights of the mixing auger of the feed mixer shown in Figures 1 and 2.

Referring to the drawings, 11 generally designates a portable feed mixing apparatus employed for mixing grain, fodder, forage, cereals and the like, said apparatus comprising a suitable wheeled frame 12, defining a support, on which is mounted a hopper 13 having a conical downwardly converging bottom portion 14 terminating in the vertical cylindrical mixing collar 15 defining a feed mixing chamber. A vertical mixing shaft 16 is journaled in the hopper 13 and extends through a cylindrical recirculating conduit 17 which opens adjacent the bottom portion of the hopper and which is adapted to receive grain therein and drive the grain upwardly responsive to the rotation of the vertical auger defined by shaft 16 and the respective successive flights 18 thereof. An import chute 19 is provided for admitting material into the lower portion of the hopper to be mixed therein, the chute communicating with a horizontally extending conduit 20 containing a helical feed screw 21 arranged to move material into the collar portion 15 so as to be mixed in said collar portion and to be elevated and recirculated by the action of the vertical auger flights 18.

As is well understood to those skilled in the art, the top end of the conduit 17 is open, allowing material elevated by the auger flights 18 to be returned into the hopper 13, the material gravitating downwardly to the mixing collar 15 and being circulated through the hopper by the action of the auger flights 18 responsive ot rotation of the shaft 16.

Disposed adjacent the conical lower portion 14 of the hopper is a discharge housing 22 containing a conveyor screw 23 extending the length thereof, the top end of the housing 22 (not shown), being open so that material may be conveyed therefrom. A flexible conduit 24 connects the lower end portion of the housing 22 to the lower portion of the hopper 13, whereby material from said lower portion of the hopper may be conveyed through the flexible conduit 24 into the discharge housing 22. A slidable gate 25 is provided, said gate being arranged between the conduit 24 and the adjacent discharge opening of the conical portion 14 of hopper 13, the gate 25 being normally disposed in closing position but being provided with an elevating chain 26 which may be employed to lift the gate 25 to establish communication between the lower portion of hopper 13 and conduit 24 when it is desired to discharge the mixed material from the hopper into the discharge housing 22.

The conveyor screw 23, the intake conveyor screw 21 and the mixing auger shaft 16 are driven from a common source of power, such as a suitable external prime mover, not shown, which drives the power input shaft 28. Power input shaft 28 is drivingly connected to a shaft 29 which is suitably coupled by a belt 30 to the shaft of the intake conveyor screw 21. Shaft 29 is provided with a beveled gear 31 which meshingly engages a beveled gear 32 secured to the bottom end of the mixing auger shaft 16, the gears 32 and 31 being enclosed in a protective housing 33. The bottom end of the discharge conveyor screw 23 is gearingly coupled by a suitable beveled gear train 34 to a driving gear 35 suitably journaled on the frame 12 of the apparatus and being arranged to be drivingly coupled at times to the shaft 29 through a conventional manually controlled clutch assembly 36.

The respective flights 18 of the vertical mixing auger are formed from circular plate members 36 which are centrally apertured, as shown at 37, and which are radially slit, as shown at 38. The central apertures 37 are adapted to receive the vertical shaft 16 and the respective free ends of the discs defined by the radial slits 38 are vertically spread apart, as shown at 39 and 40 in Figure 4 so as to define a generally helical configuration. The successive flights are fastened together at the radial edges defined by the slits 38 thereof, as by welds 41, the helical inner edges of the discs being similarly welded to the vertical auger shaft 16, as shown at 42.

As shown in Figure 2, the bottom wall of the mixing collar member 15 comprises the horizontal top wall 43 of a box-like frame member 44 which is rigidly secured on the frame 12 of the apparatus. The horizontal wall 43 is provided with a circular aperture 45 centrally located in the mixing collar member through which the lower end portion of the vertical auger shaft 16 extends, a vertical sleeve-like member 46 being secured on the member 43 at the margin of the aperture 45, as shown in Figure 2. A generally cylindrical depending annular flanged collar 47 having cylindrical skirt portion is rigidly secured to the vertical auger shaft 16 and closely receives the upstanding sleeve 46, defining a restricted space therebetween adapted to receive lubricant. A grease fitting 48 is provided on the depending cylindrical flanged collar 47, whereby grease may be injected into the restricted space between the collar 47 and the sleeve member 46.

Inasmuch as some clearance must exist between the rotating flange member 47 and the sleeve 46, fine dust may enter the space between the members 46 and 47, but the major portion of the dust mixes with the grease in the space to form a dust seal and to prevent any substantial quantity of the dust from passing through the clearance space between the flange collar 47 and the sleeve member 46 and thence through the clearance space between the lower end portion of shaft 16 and the edge of aperture 45.

A main bearing for the shaft 16 is provided, said main bearing comprising the stationary outer race member 50 which is secured to the top wall 58 of the gear box 33 and the inner race member 51 which is secured to the lower portion of the shaft 16, a plurality of ball bearings 52 being provided between the race members 50 and 51, as shown in Figure 2. To prevent dust from sifting downwardly through the aperture 45 onto the ball bearings 52, a flat circular horizontal guard shield plate 54 is secured on the shaft 16 immediately above the inner race 51, the disc 54 being of substantially greater diameter than the stationary outer race 50 so as to completely overlie the same and to extend outwardly therebeyond.

As shown in Figure 2, the frame member 44 includes a horizontally extending top frame plate 58, secured to and spaced below wall member 43, which is centrally apertured in axial alignment with the vertical auger shaft 16, as shown at 58', to receive the upper portion of outer race 50 therethrough. The horizontal bottom flange 59 of the outer race is clampingly secured between the frame plate 58 and the top wall of the gear box 33 by fastening bolts 60.

As will be readily apparent, during the operation of the apparatus, the feed material is mixed in the vertical collar portion 15, as above described, and leakage of the feed material through the aperture 45 is prevented by the sealing cooperation of the lubricant with the dust in the space between the flange 47 and the sleeve 46. Should any dust seep through the aperture 45, the dust is prevented from dropping onto the ball bearings 52 by the shield disc 54 which completely overlies and protects the ball bearings, as is clearly shown in Figure 2.

Rigidly secured to the cylindrical portion of the flange member 47 are a plurality of outwardly projecting triangular vertical agitator lugs 62, said lugs being spaced apart in the manner illustrated in Figure 3, and rotating with the shaft 16 to agitate the loose feed material in the bottom portion of collar 15 so as to keep the material in said bottom portion in a fluent condition and to facilitate the elevation of the material by the vertically spaced flights 18 of the mixing auger.

While a specific embodiment of an improved bearing protection assembly for the vertical mixing shaft of a feed mixing apparatus has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a feed mixing apparatus, a support, a vertical generally cylindrical mixing collar mounted on said support and defining a feed mixing chamber, said support including a horizontal wall member secured to the bottom of said mixing collar, said horizontal wall member being formed with an aperture centrally located in said collar, an upstanding sleeve secured to the wall member around said aperture, a vertical mixing auger in said collar and having a shaft extending rotatably through said sleeve, an annular flange member secured to said shaft immediately above said sleeve and having a depending outer cylindrical skirt portion receiving said sleeve, a plurality of outwardly projecting spaced vertical triangular agitating lugs on said skirt portion adjacent said horizontal wall member, a horizontal frame plate secured to said support and spaced below said wall member, said frame plate being formed with a central aperture axially aligned with the vertical auger, a ball bearing assembly beneath said wall member comprising an outer race member secured to said frame plate, an inner race member secured to the lower portion of said shaft, and a plurality of bearing balls disposed between said race members, and a flat circular shield plate secured to the shaft immediately above said bearing assembly in the space between said frame plate and said horizontal wall member and being of substantially greater diameter than said outer race member so as to completely overlie and cover said race members and bearing balls.

References Cited in the file of this patent

UNITED STATES PATENTS

| | | |
|---|---|---|
| 1,232,343 | Lockwood | July 3, 1917 |
| 1,268,813 | Benjamins | June 11, 1918 |
| 1,272,171 | Zinssmeister | July 9, 1918 |
| 1,720,360 | Haines | July 9, 1929 |
| 1,931,706 | Powell | Oct. 24, 1933 |
| 1,997,301 | Kniffen et al. | Apr. 9, 1935 |
| 2,096,728 | Bighouse | Oct. 26, 1937 |
| 2,266,407 | Bruestle | Dec. 16, 1941 |
| 2,774,576 | Frank | Dec. 18, 1956 |
| 2,815,941 | Schmale | Dec. 10, 1957 |
| 2,875,897 | Booth | Mar. 3, 1959 |